(12) United States Patent
Gupta et al.

(10) Patent No.: US 10,776,437 B2
(45) Date of Patent: Sep. 15, 2020

(54) TIME-WINDOW COUNTERS FOR SEARCH RESULTS ON ONLINE SOCIAL NETWORKS

(71) Applicant: Facebook, Inc., Menlo Park, CA (US)

(72) Inventors: Ashish Gupta, Mountain View, CA (US); Jiajin Yu, Fremont, CA (US); Rajat Raina, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 377 days.

(21) Appl. No.: 15/702,558

(22) Filed: Sep. 12, 2017

(65) Prior Publication Data

US 2019/0080010 A1 Mar. 14, 2019

(51) Int. Cl.
| | |
|---|---|
| *G06F 16/9535* | (2019.01) |
| *G06F 16/248* | (2019.01) |
| *G06F 16/2458* | (2019.01) |
| *G06F 16/2457* | (2019.01) |
| *G06F 16/2453* | (2019.01) |
| *G06F 16/242* | (2019.01) |

(52) U.S. Cl.
CPC ........ *G06F 16/9535* (2019.01); *G06F 16/243* (2019.01); *G06F 16/248* (2019.01); *G06F 16/2453* (2019.01); *G06F 16/2477* (2019.01); *G06F 16/24578* (2019.01)

(58) Field of Classification Search
CPC ............. G06F 16/9535; G06F 16/2453; G06F 16/243; G06F 16/248; G06F 16/2477; G06F 16/24578
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |

(Continued)

OTHER PUBLICATIONS

Whiting, Recent and Robust Query Auto-Completion, pp. 971-981, Apr. (Year: 2014).*

(Continued)

*Primary Examiner* — Albert M Phillips, III
(74) *Attorney, Agent, or Firm* — Jordan IP Law, LLC

(57) ABSTRACT

In one embodiment, a method includes receiving a search query and identifying one or more n-grams. The method also includes accessing, for each identified n-gram, a time-based distribution that includes a count of actions associated with the n-gram. The actions may have occurred within several time windows, and the time-based distribution may count the actions within each time window. The method may also include determining one or more extrema time windows. The method may also include modifying the search query based on the determined extrema time windows. The method also includes executing the modified search query, ranking identified content objects, and sending search results to a client system. The search results may be displayed in ranked order based on the rankings of the corresponding content objects.

16 Claims, 6 Drawing Sheets

(56) References Cited

U.S. PATENT DOCUMENTS

| | | |
|---|---|---|
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |

(56) References Cited

U.S. PATENT DOCUMENTS

| | | |
|---|---|---|
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2017/0046390 A1 | 2/2017 | Jain |
| 2017/0083523 A1 | 3/2017 | Philip |

OTHER PUBLICATIONS

Goldbandi, Expediting Search Trend Detection via Prediction of Query Counts, pp. 1-10, Feb. (Year: 2013).*

Cai, Prefix-Adaptive and Time-Sensitive Personalized Query Auto Completion, IEEE Transactions on Knowledge and Data Engineering, vol. 28, No. 9, Sep., pp. 2452-2466. (Year: 2016).*

Shokouhi, Time-Sensitive Query Auto-Completion, pp. 601-610, Aug. (Year: 2012).*

Cai, Time-sensitive Personalized Query Auto-Completion, pp. 1599-1608, Nov. (Year: 2014).*

U.S. Appl. No. 15/260,214, filed Sep. 8, 2016, Gupta.
U.S. Appl. No. 15/392,362, filed Dec. 28, 2016, Mashiach.
U.S. Appl. No. 15/608,216, filed May 30, 2017, Ringger.

* cited by examiner

US 10,776,437 B2

TIME-WINDOW COUNTERS FOR SEARCH RESULTS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a communication network may use one or more time-based distributions to return recent search results when recent search results are appropriate. The time-based distributions may represent a count of actions with respect to a particular n-gram. The actions may have been performed by users of the communication network. The user actions may fall into particular time windows depending on when the action was performed. The communication network may identify one or more "extrema" time windows based on the time-based distribution for the particular n-gram. An extrema time window may be a time window that corresponds to a local or global maximum or minimum count of actions in the time-based distribution. The communication network system may modify the search query based on the identified extrema time windows, and then execute the modified search query to identify content objects that match the search query. The communication network may also rank the identified content objects and send the user a search-results interface comprising search results that correspond to the ranked content objects.

As an example and not by way of limitation, the communication network may receive a search query from a first user comprising the string "alabama." The communication network may identify the n-gram "alabama" and access a time-based distribution for this n-gram. The time-based distribution may comprise a count of actions. In this example the count of actions may be a count of user-inputted search queries as a function of time that contain the n-gram "alabama." The time-based distribution may also have a number of time windows, each time window corresponding to a particular period of time preceding the search query from the first user. As an example and not by way of limitation, the most recent time window may be eight hours prior to the search query until the time of the search query, the next time window may be sixteen hours to eight hours prior to the search query, and so on. The time-based distribution may be visualized as a histogram, wherein the x-axis measures time and the y-axis measures the number of searches that comprise the n-gram "alabama." The time-based distribution may reveal that a high number of users search "alabama" within the last eight hours. This may be apparent because there may be a peak in the histogram during the most recent time window. Based on this extrema time window being a recent time window (e.g., preceding a threshold age), the communication network may infer that some recent event has generated significant user interest in "alabama" (e.g., Alabama is about to hold a Senate election, so more users are inputting search queries that include "alabama" to learn more about the election race). Based on the extrema time window occurring within a threshold amount of time, the communication network may modify or rewrite the search query provided by the first user. The modification may be, for example, to generate instructions to search a core index that indexes recently uploaded content objects (e.g., content objects that have an upload age within a threshold number of days), instead of a full index that indexes all uploaded content objects. This may ensure that only recently uploaded content objects are sent to the user. Because the core index may be much smaller than the full index, modifying the search query to generate instructions to search a core index may result in shorter search times, faster processing speeds, and less computing resources used for each search query.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate

DESCRIPTION OF EXAMPLE EMBODIMENTS

System Overview

Figure 1:
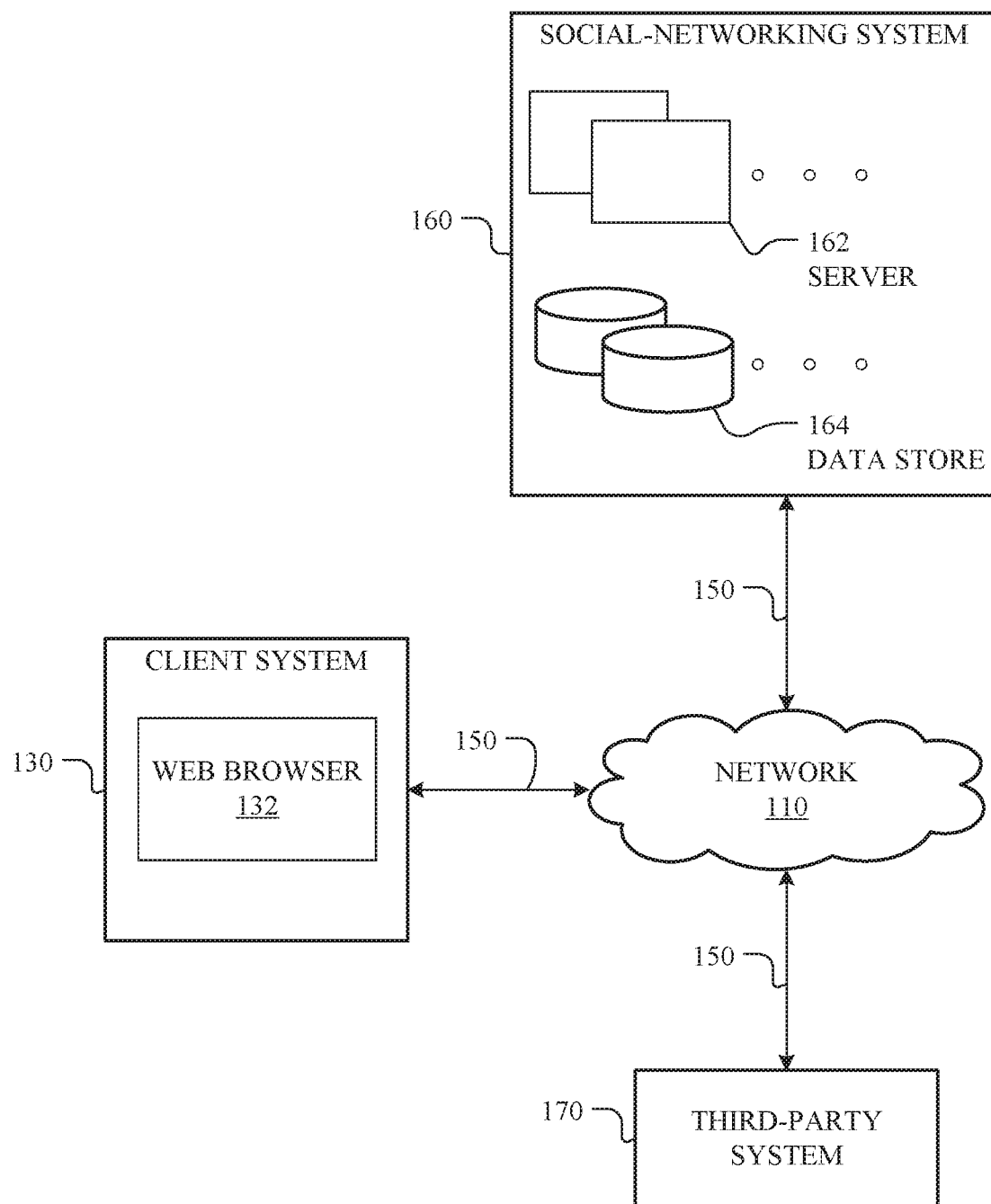
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
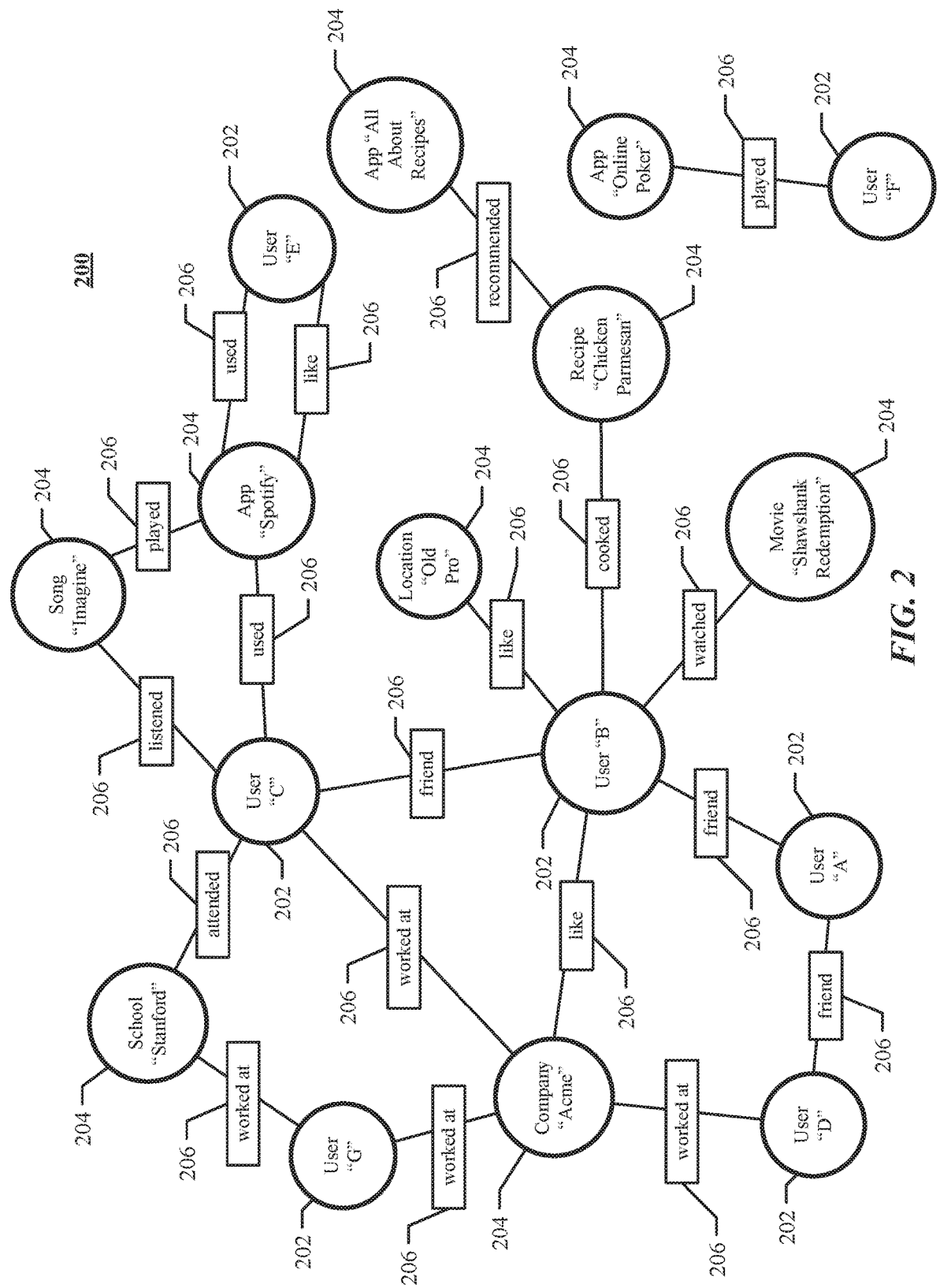
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No.

13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Time-Window Counters for Search Results

In particular embodiments, the social-networking system 160 may use one or more time-based distributions to return recent search results when recent search results are appropriate. The time-based distributions may represent a count of user actions performed within multiple time windows with respect to a particular n-gram. The social-networking system 160 may identify one or more "extrema" time windows based on the time-based distribution for the particular n-gram. An extrema time window may be a time window that corresponds to a local or global maximum or minimum in the time-based distribution. An example of an extrema time window may be the time window in which the most user actions were performed within a threshold number of time windows. The social-networking system 160 system may modify the search query based on the identified extrema time windows, and then execute the modified search query to identify content objects that match the search query. The social-networking system 160 may also rank the identified content objects and send the user a search-results interface comprising search results that correspond to the ranked content objects. Although this disclosure discusses these and other methods as being performed by a social-networking system, this disclosure contemplates the methods discussed herein as being performed by any suitable communication network.

To illustrate the concept of returning recent search results when recent search results are appropriate, consider the following examples: As an example and not by way of limitation, a user may search for "Zaza Pachulia," who is a professional basketball player on the Golden State Warriors. During the 2017 NBA Playoffs, Zaza was involved in some controversy when a foul he committed against Kawhi Leonard caused Leonard to sprain his ankle. If a user searched "Zaza Pachulia" the day after this incident, the user would likely be more interested in seeing a post related to this controversy than older posts, such as, for example, a post about him being drafted by the Orlando Magic in 2003. In this example, a time-window counter may show that lots of users have searched "Zaza Pachulia" or have clicked on content that was recently uploaded to the communication network. This disclosure discusses possible ways to return more recent search results in situations like this. As another example and not by way of limitation, a user may search "Best BBQ Ribs Recipes." In this situation, the user may not care how recently the content (e.g., post, recipe, video, photo) was uploaded—she may only care that the content teaches her how to make excellent BBQ ribs. The time-based distributions may not show any preference toward a particular time window. In other words, the representation of the time-based distribution (e.g., histogram) of actions may not show any prominent peaks. In this case it may be desirable for the communication network to return old results as well as more recent results.

In particular embodiments, the social-networking system 160 may receive a search query from a user. As an example and not by way of limitation, the social-networking system 160 may receive a search query from a first user comprising the string "alabama." The social-networking system 160 may identify the n-gram "alabama" and access a time-based distribution for this n-gram. The time-based distribution may comprise a count of the number of user-inputted search queries as a function of time that contain the n-gram "alabama." The time-based distribution may also have a number of time windows, each time window corresponding to a particular period of time preceding the search query from the first user. As an example and not by way of limitation, the most recent time window may be eight hours prior to the search query until the time of the search query, the next time window may be sixteen hours to eight hours prior to the search query, and so on. A visualization of the time-based distribution may resemble a histogram, wherein the x-axis measures time and the y-axis measures the number of searches that comprise the n-gram "alabama." The time-based distribution may reveal that a high number of users search "alabama" within the last eight hours. This may be apparent because there may be a peak in the histogram during the most recent time window. Based on this extrema time window being a recent time window (e.g., preceding a threshold age), the social-networking system 160 may infer that some recent event has generated significant user interest in "alabama" (e.g., Alabama is about to hold a senate election, so more users are inputting search queries that include "alabama" to learn more about the election race). Based on the extrema time window occurring within a threshold amount of time, the social-networking system 160 may modify the search query input by the first user. The modification may be to generate instructions to search a core index that indexes recently uploaded content objects (e.g., content objects that have an upload age within a threshold number of days), instead of a full index that indexes all uploaded content objects. This may ensure that only recently uploaded content objects are sent to the user.

In particular embodiments, the social-networking system 160 may receive, from a client system 130 associated with a first user of the social-networking system 160, a search query comprising a character string. The character string may include any combination of letters, numbers, symbols, or any other suitable input. As an example and not by way of limitation, the character string may be "alabama football." As another example and not by way of limitation, the character string may be "who is the head coach of alabama?" As another example and not by way of limitation, the character string may be "alabama senate race." Although this disclosure describes receiving a search query in a particular manner, this disclosure contemplates receiving a search query in any suitable manner.

In particular embodiments, the social-networking system 160 may parse the search query to identify one or more n-grams. Parsing the search query may include analyzing the character string to identify one or more identifiable terms separated by spaces, logical separation, or any other suitable form of separation. As an example and not by way of limitation, the social-networking system 160 may parse the character string "alabama football" to identify three n-grams: "alabama," "football," and "alabama football." As another example and not by way of limitation, the social-networking system 160 may parse the character string "alabama senate race" and identify five n-grams: "alabama," "senate," "race," "alabama senate," and "senate race." In this example, the parsing may be limited to unigrams and bigrams, but the parsing identify any suitable n-grams (e.g., the trigram "alabama senate race"). Although this disclosure describes parsing a character string to identify n-grams in a particular manner, this disclosure contemplates parsing a character string to identify n-grams in any suitable manner.

In particular embodiments, the social-networking system 160 may access, for each identified n-gram, a time-based distribution. The time-based distribution may comprise a count of actions associated with the n-gram. The actions may be any suitable action that users of a social-networking system 160 may perform on an online social network. Examples of actions associated with the n-grams include inputting a search query that includes the n-gram, clicking on a search result that includes the n-gram, interacting with a content object that is associated with the n-gram (e.g., sharing, liking, reacting to, commenting on), posting a content object that is associated with the n-gram, or any other suitable action. The time-based distribution may be visualized as a histogram that counts the relevant action or actions as a function of time. As an example and not by way of limitation, an identified n-gram may be "alabama." The relevant action may be search queries that include the n-gram "alabama." The time-based distribution for this particular n-gram and particular action may be a count of search queries input to the social-networking system 160 that comprise the n-gram "alabama." The time-based distribution may comprise several time windows. A time window may be a representation of a particular amount of time (e.g., 1 hour, 4 hours, 1 day). The time-based distribution may include any number of time windows that each measure any amount of time. In particular embodiments, the time windows may cover an equal period of time (e.g., each time window represents 1 day). In particular embodiments, the time windows for a particular time-based distribution may not cove equal amounts of time. As an example and not by way of limitation, a first time window for a time-based distribution may represent the previous hour (e.g., the hour before the search query was inputted by the user). A second time window may be adjacent to the first time window and may represent the four hours prior to the time period represented by the first time window. A third time window may be adjacent to the second time window in the representation and may represent the eight hours prior to the time period represented by the second time window. Although this disclosure describes accessing a time-based distribution in a particular manner, this disclosure contemplates accessing a time-based distribution in any suitable manner.

Figure 3:
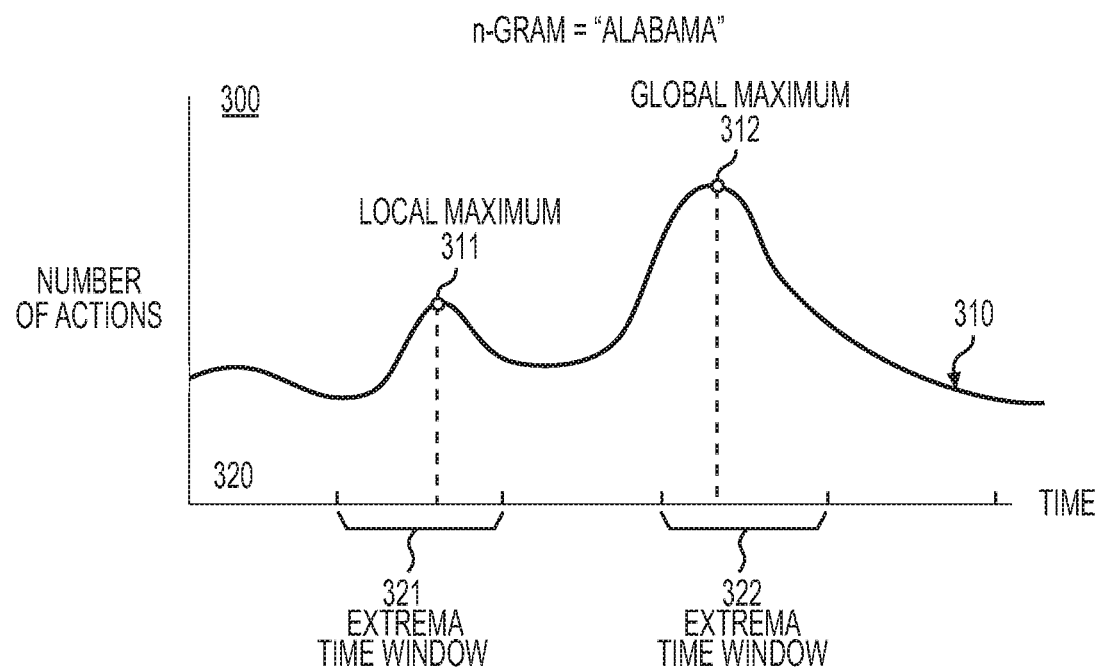
FIG. 3 illustrates an example representation of a time-based distribution for an example n-gram.

FIG. 3 illustrates an example representation of a time-based distribution 300 for an example identified n-gram. In the example of FIG. 3 the n-gram is "alabama." The time-based distribution 300 may include several time windows 320 and a curve 310. Curve 310 may represent a count of actions as a function of time. Examples of counts of actions for time-based distribution 300 may include a count of queries that use the n-gram "alabama," a count of posts of content objects that contain the n-gram "alabama," a count of impressions of content objects that contain the n-gram "alabama," a count of click-throughs on content objects that contain the n-gram "alabama," or any other suitable action that may be performed on the communication network or online social network. In particular embodiments, the social-networking system 160 may determine one or more extrema time windows from among the several time windows in a given time-based distribution. In the example of FIG. 3, curve 310 may include one or more "extrema." An extrema time window may correspond to a time window having a count of actions that is a local or global extremum for the time-based distribution. In the example of FIG. 3, curve 310 includes two extrema 311 and 312. Extremum 311 may be a local maximum because it is the highest point within a threshold amount of time (e.g., within two time windows, 36 hours, four days). Extremum 312 may be a global maximum because it is the highest point in the time-based distribution. Because extrema 311 and 312 fall within particular time windows 321 and 322 respectively, those time windows may each be referred to as an "extrema time window." This may be one way the social-networking system 160 determines one or more extrema time windows based on the time-based distribution. Although this disclosure describes determining one or more time windows for a particular time-based distribution in a particular manner, this disclosure contemplates determining one or more time windows for any suitable time-based distribution in any suitable manner.

Figure 4:
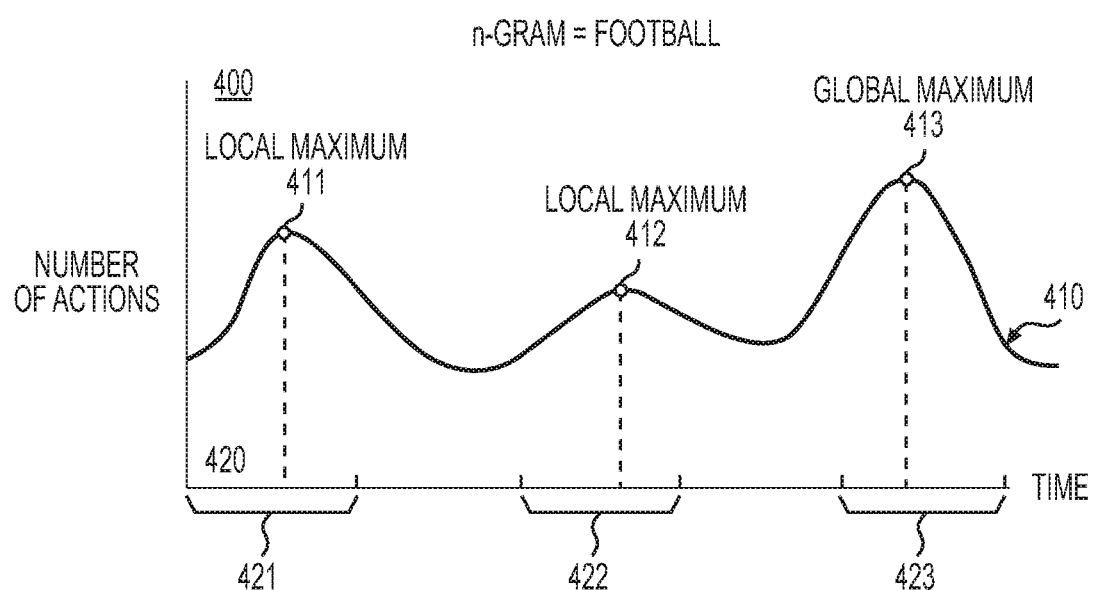
FIG. 4 illustrates another example representation of a time-based distribution for another example n-gram.

FIG. 4 illustrates an example representation of another time-based distribution 400 for another identified n-gram. In the example of FIG. 4, the n-gram is "football." The time-based distribution 400 may include several time windows 420 and a curve 410. Curve 410 may represent a count of actions as a function of time, like curve 310 discussed above. In the example of FIG. 4, curve 410 has three extrema: two local maximums 411, 412 and one global maximum 413. Note that curve 410 also has at least two local or global minimums, which are not labeled. Because extrema 411, 412, and 413 fall within particular time windows 421, 422, and 432 respectively, those time windows may each be referred to as an "extrema time window." Although this disclosure describes accessing a particular representation of a time-based distribution in a particular manner, this disclosure contemplates accessing any suitable representation of a time-based distribution in any suitable manner.

Figure 5:
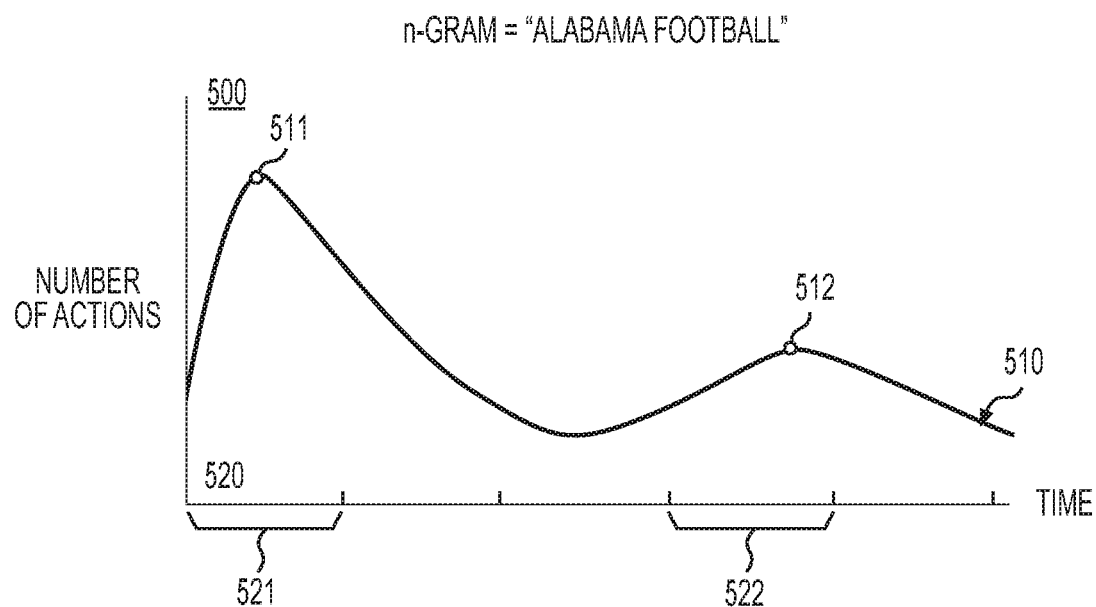
FIG. 5 illustrates another example representation of a time-based distribution for another example n-gram.

FIG. 5 illustrates an example representation of another time-based distribution 500 for another identified n-gram. In particular embodiments, a time-based distribution may correspond to an identified n-gram of two or more terms (i.e., a bigram or larger). As an example and not by way of limitation, an n-gram of two or more terms may be "alabama football." In particular embodiments, a time-based distribution may be generated in response to receiving a search query. As an example and not by way of limitation, the social-networking system 160 may receive a search query that comprises the n-gram "alabama football." In response to receiving the search query, the social-networking system 160 may generate one or more time-based distributions for the n-gram "alabama football." In the example of FIG. 5, the n-gram is "alabama football." The time-based distribution 500 may include several time windows 520 and a curve 510. Curve 510 may represent a count of actions as a function of time, like curve 310 and 410 discussed above. In the example of FIG. 5, curve 510 has two extrema: a global maximum 511 and a local maximum 512. Note that curve 510 also has at least one minimum, which is not labeled. Because extrema 511 and 512 fall within particular time windows 521 and 522 respectively, those time windows may each be referred to as an "extrema time window." Although this disclosure describes accessing a particular representation of a time-based distribution in a particular manner, this disclosure contemplates accessing any suitable representation of a time-based distribution in any suitable manner.

Figure 6:
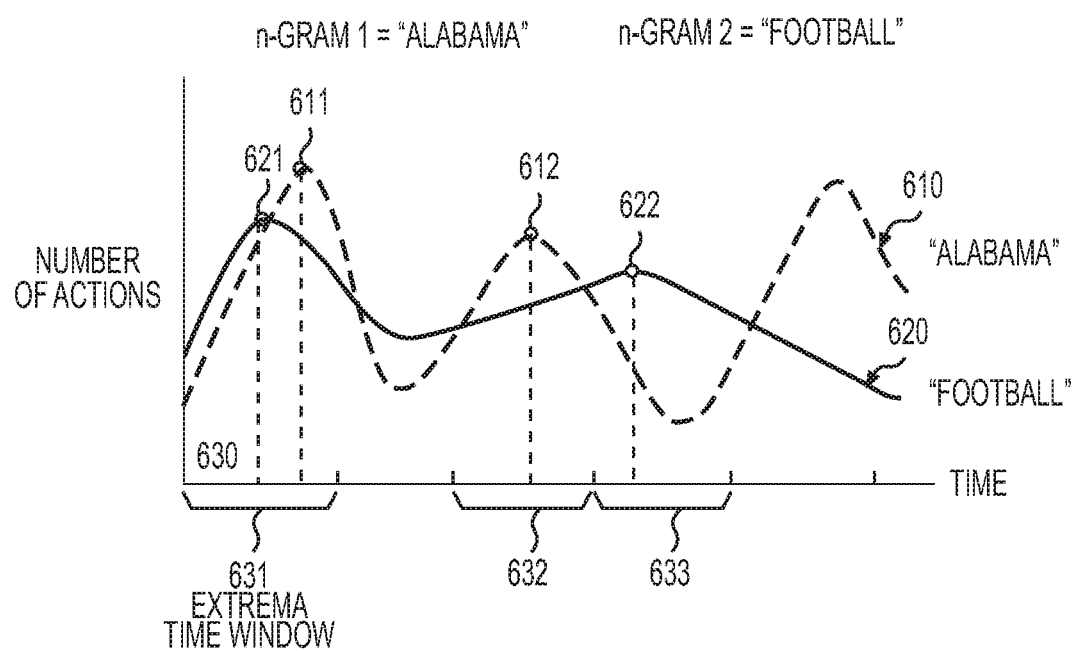
FIG. 6 illustrates another example representation of a time-based distribution for two example n-grams.

FIG. 6 illustrates an example representation of another time-based distribution for two identified n-grams. In particular embodiments, the social-networking system 160 may identify n-grams that comprise two or more terms (e.g., "alabama football"). However, there may be no time-based distribution that corresponds to the identified n-gram. This may be because in particular embodiments, the time-based distributions may be pre-generated. In these cases, the social-networking system 160 may not generate a time-based distribution in response to a search query, but rather may access one or more pre-generated time-based distributions. FIG. 6 may be an example representation of the analysis that occurs when no pre-generated time-based distribution exists for a particular n-gram. As an example and not by way of limitation, the social-networking system 160 may identify an n-gram as "alabama football." But there may be no time-based distribution for "alabama football." Instead, two time-based distributions may exist: one for "alabama," and one for "football." The social-networking system 160 may access both of these time-based distributions and analyze them jointly. In particular embodiments, determining one or more extrema time windows may be accomplished by determining which time windows correspond to extrema of two or more time-based distributions. In the example of FIG. 6, the representation may illustrate an overlapping of the time-based distribution for "alabama" and the time-based distribution for "football." The representation may comprise two curves 610 and 620. Curve 610 may correspond to the n-gram "alabama" and curve 620 may correspond to the n-gram "football." Curve 610 may have extrema 611, and 612 and curve 620 may have extrema 621 and 622. In the example representation, extrema 611 and 621 fall in the same time window 631, but extrema 612 and 622 fall in separate time windows 632 and 633. In particular embodiments, the time window corresponding to extrema 611 and 621 may be an extrema time window 631 because both curve 610 and curve 620 have extrema in that time window. Although this disclosure describes accessing a particular representation of a time-based distribution in a particular manner, this disclosure contemplates accessing any suitable representation of a time-based distribution in any suitable manner.

In particular embodiments, the time-based distribution may be generated based on time-window counters associated with search queries. A time-window counter may count one or more actions performed on the online social network or communication network for each of a plurality of time windows. Each action may correspond to a parameter that may be monitored by the time-window counters. As an example and not by way of limitation, a time-window counter may count the number of times users have inputted a search query that comprises the bigram "alabama football" in each of a plurality of time windows (e.g., the last 2 hours, the last 8 hours, the last 48 hours). As another example and not by way of limitation, a time-window counter may count the number click-throughs for content objects that contain the bigram "alabama football." A click-through may occur when a user sees a link (e.g., module, URL) to a content object and selects that link. Example parameters include the parameters shown in the following table, whose definitions appear to the right of the parameter.

TABLE 1

Time-Window Counter Parameters

| Parameter | Parameter Definition |
|---|---|
| <n-gram> | an n-gram from the search query |
| <queryTime> | the date and time that the communication network received the search query |
| <postTime> | the date and time that a content object clicked on responsive to the search query was posted to the communication network |
|  | the identification strings of the identified objects matching the search query, where i is the number of identified objects |
| <click ID> | the identification string of a content object clicked on responsive to the search query |
| <click ID age> | the age of the content object that was selected by the user, wherein <click ID age> = <postTime> − <queryTime> |

In particular embodiments, the social-networking system 160 may modify the search query based at least in part on the determined extrema time windows. If one or more of the determined extrema time windows is a global or local maximum and not older than a threshold age, then the social-networking system may generate instructions to search a core index. The core index may be an index that indexes content objects that were uploaded to the online social network within a threshold number of days (e.g., 14 days). The core index may be a relatively small index and may be more easily searched than the full index. The full index may index all content objects (e.g., posts, photos, videos, status updates, articles, links) posted to the online social network. When a content object is first posted to the online social network, it may be indexed on both the core index and the full index. Then, when the threshold number of days have passed (e.g., 14 days have passed), the content object may be deleted off the core index. In particular embodiments, the social-networking system 160 may determine to redirect the search based on a time-based distribution of queries to the online social network, a time-based distribution of timestamps of content uploaded to the online social network, a time-based distribution of timestamps of content objects that were clicked on, or any other suitable metric. As an example and not by way of limitation, if the social-networking system 160 determines to redirect the search query based on a time-based distribution of timestamps of content objects that were clicked on, the social-networking system 160 may count every content object that was clicked on for the n-gram "Manchester." If the distribution of timestamps of objects posted to the online network indicates that a threshold portion of selected (e.g., clicked on) were posted within the last 3 days, the social-networking system may assume that search queries that include "manchester" are searches for a recent event. For example, a terrorist attack may have occurred in Manchester, England. For the next hours and days, users searching "manchester" may be more interested in the terrorist attack than in the football team Manchester United. The social-networking system may estimate user interest in more recent posts by analyzing one or more of the time-based distributions as discussed herein. If the social-networking system 160 determines that users are more interested in recent posts (e.g., because a threshold percentage of users clicked on posts that have an upload age less than a threshold number of days), the social-networking system 160 may redirect the search query by sending instructions to search the core index. Because the core index may be much smaller than the full index, modifying the search query to generate instructions to search a core index may result in shorter search times, faster processing speeds, and less computing resources used for each search query. Although this describes modifying a search query in a particular manner, this disclosure contemplates modifying a search query in any suitable manner.

In particular embodiments, it may be desirable to return some recently uploaded content objects and some older content objects. As an example and not by way of limitation, most users who search "manchester" may be interested in a recent event that occurred in manchester, but some users may be searching for the football team Manchester United. In this scenario, the social-networking system 160 may modify the search query to include instructions to identify a specified portion of content objects having an upload age within one or more of the determined extrema time windows. Continuing the above example, the time-based distribution for the term "manchester" may have two peaks: a global maximum at a first time window corresponding to four hours before the search query to immediately before the search query, and a local maximum at a second time window corresponding to 36 hours to 32 hours prior to the search query. The social-networking system 160 may modify the search query to include instructions such that 40% of the search results correspond to objects uploaded during the first time window and 20% of the search results correspond to objects uploaded during the second time window. The social-networking system 160 may indicate that the other 40% of search results can correspond to objects uploaded at any time. Modifying the search query in the above manner may result in at least some search results originating from the core index. Any searching of the core index may result in shorter search times, faster processing speeds, and reduced use of computing resources because the core index may be much smaller than the full index. Thus, any time the core index is searched, the above technological advantages may occur. In particular embodiments, the social networking system 160 may execute the modified search query to identify one or more content objects that match the modified search query. Execution of the modified search query may be performed using any suitable information retrieval method or methods. Although this describes modifying a search query in a particular manner, this disclosure contemplates modifying a search query in any suitable manner.

In particular embodiments, the social networking system 160 may rank the identified content objects. Ranking may be based on relevancy, recency, or a combination of relevancy and recency. In particular embodiments, ranking the identified content objects may include ranking objects based on their upload age. As an example and not by way of limitation, a search query may return 300 results. The social-networking system 160 may analyze those results to determine how many are recent results (i.e., how many correspond to content objects posted to the online social network within a threshold number of days). If the proportion of recent results exceeds a threshold portion, the social-networking system may downrank older posts. As an example and not by way of limitation, if 250 of the 300 returned results are recent (e.g., posted within the last 24 hours), the social-networking system may downrank the 50 search results that correspond to objects posted more than 24 hours ago. In particular embodiments, content objects having an upload age within one or more of the determined extrema time windows are upranked. As an example and not by way of limitation, a time-based distribution may indicate that 40% of search results correspond to object posed to the online social network in the last six hours, 20% from the preceding 18 hours, 20% from the preceding 48 hours, and 20% from earlier than the preceding 48 hours. Based on this distribution of search results, the social-networking system 160 may uprank content objects posted during these time windows. In particular embodiments, the upranking may be accomplished by assigning weights to the search results based on which time-window they fall into. Continuing the example, posts from the last six hours may be assigned a weight of 1.4, posts from the preceding 18 hours may be assigned a weight of 1.2, and so on for the other search results that fall into older time windows. Although this disclosure describes ranking search results in a particular manner, this disclosure contemplates ranking search results in any suitable manner.

In particular embodiments, ranking the search results may be based on the recency of the creation of one or more user nodes 202, concept nodes 204, or edges 206 between the user node corresponding to the querying user and another user node 202 or concept node 204. As discussed herein, a user may have an affinity coefficient with respect to one or more other users or concepts that correspond to user nodes 202 and concept nodes 204. Those affinities may be represented by edges 206. The edges 206 may have a type and may be associated with a weight. Edge type may be the type of relationship that the user has with another user or concept. Types of edges include friend relationships, sibling relationships, or actions taken with respect to particular nodes, such as "liked," "played," "followed," "watched," "listened to," or "read." As an example and not by way of limitation, a user may watch a video of highlights from the latest Manchester United soccer game. This may create an edge connection between the user's user node and a concept node corresponding to Manchester United. Alternatively, watching the video may increase the affinity coefficient that the user already has with respect to Manchester United. As discussed herein, affinity may be associated with a decay factor. A coefficient may include a decay factor that causes the strength of the signal provided by particular actions to decay with time, such that more recent actions are more relevant when calculating the coefficient. The ranking of the search results may be based in part on the affinity coefficient, which is based on the decay factor. As an example and not by way of limitation, if a user recently watched several videos related to the Manchester United football team, this affinity coefficient with the Manchester United football team may be high. Then if the user searches "manchester," the search results may include several posts about a recent terrorist attack in Manchester, England (which may all be recent posts), but also several posts about the Manchester United football team (which may be older posts). Because this particular user has a high affinity coefficient with respect to the Manchester United football team (e.g., because he recently watched several videos related to it), the social-networking system 160 may uprank search results related to the Manchester United football team. If the user had not recently watched those videos, the social-networking system 160 may have downranked the search results related to the Manchester United Football team, because those are older posts. Although this disclosure describes ranking search results in a particular manner, this disclosure contemplates ranking search results in any suitable manner.

In particular embodiments, the social networking system 160 may send to the client system 130 of the querying user, instructions for displaying a search-results interface comprising one or more search results corresponding to one or more of the identified content objects, respectively. The search results may be displayed in ranked order based on the rankings of the corresponding content objects. Sending the search-results interface may be accomplished using any suitable method.

Figure 7:
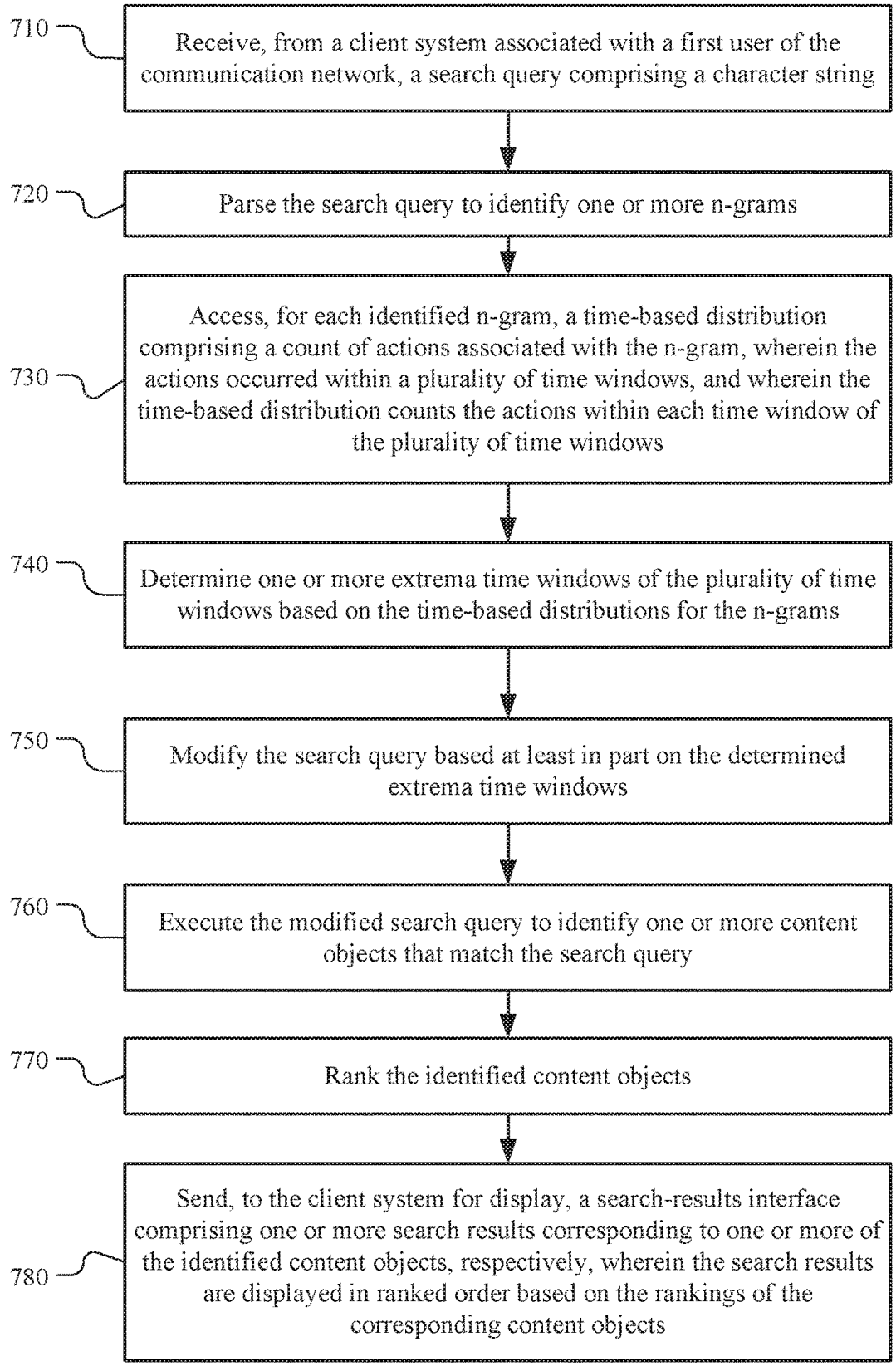
FIG. 7 illustrates an example method for using one or more time-based distributions to return recent search results when recent search results are appropriate.

FIG. 7 illustrates an example method 700 for using one or more time-based distributions to return recent search results when recent search results are appropriate. The method may begin at step 710, where the social-networking system 160 may receive, from a client system 130 associated with a first user of the communication network, a search query comprising a character string. At step 720, the social-networking system 160 may parse the search query to identify one or more n-grams. At step 730, the social-networking system 160 may access, for each identified n-gram, a time-based distribution comprising a count of actions associated with the n-gram, wherein the actions occurred within a plurality of time windows, and wherein the time-based distribution counts the actions within each time window of the plurality of time windows. At step 740, the social-networking system 160 may determine one or more extrema time windows of the plurality of time windows based on the time-based distributions for the n-grams. At step 750, the social-networking system 160 may modify the search query based at least in part on the determined extrema time windows. At step 760, the social-networking system 160 may execute the modified search query to identify one or more content objects that match the search query. At step 770, the social-networking system 160 may rank the identified content objects. At step 780, the social-networking system 160 may send, to the client system 130, a search-results interface comprising one or more search results corresponding to one or more of the identified content objects, respectively, wherein the search results are displayed in ranked order based on the rankings of the corresponding content objects. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for using one or more time-based distributions to return recent search results when recent search results are appropriate including the particular steps of the method of FIG. 7, this disclosure contemplates any suitable method for using one or more time-based distributions to return recent search results when recent search results are appropriate including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 8:
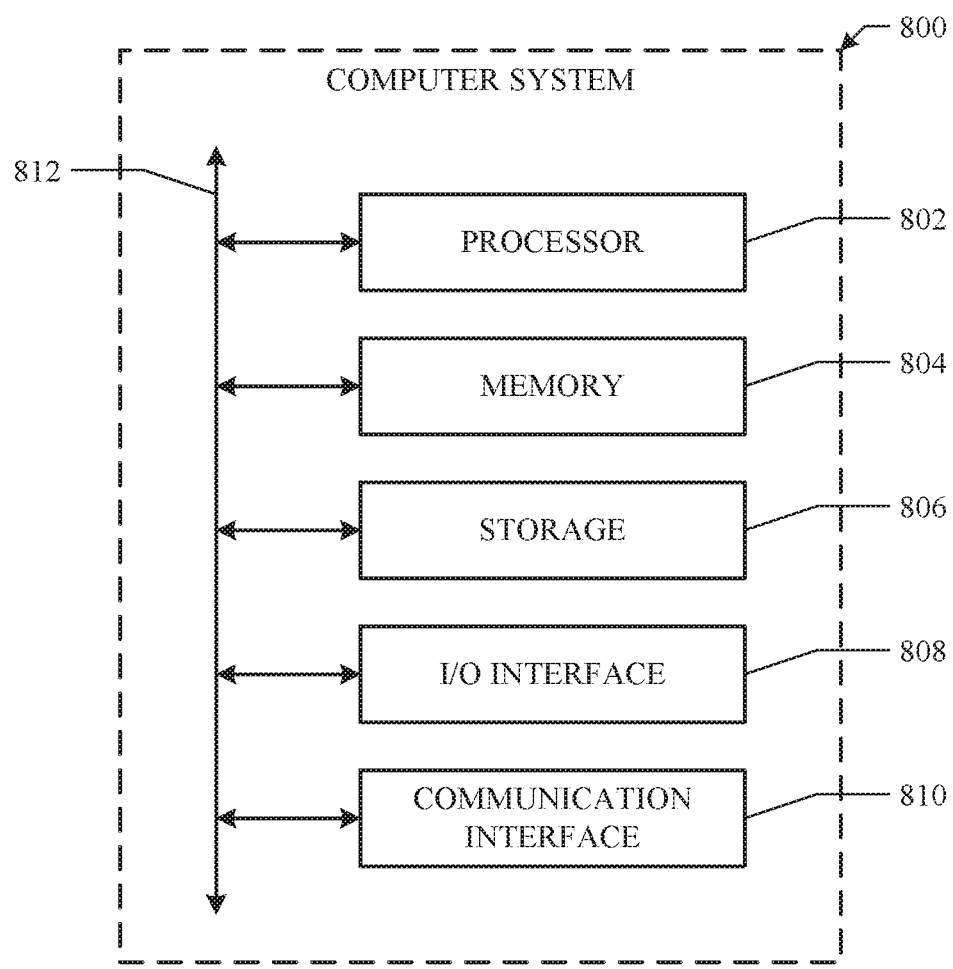
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of a communication network:
   receiving, from a client system associated with a first user of the communication network, a search query comprising a character string;
   parsing the search query to identify n-grams;
   accessing, for each identified n-gram, a time-based distribution comprising a count of actions associated with the n-gram, wherein the actions occurred within a plurality of time windows, and wherein the time-based distribution counts the actions within each time window of the plurality of time windows;
   determining one or more extrema time windows of the plurality of time windows based on the time-based distributions for the n-grams;
   modifying the search query based at least in part on the determined one or more extrema time windows;
   executing the modified search query to identify one or more content objects that match the modified search query;
   ranking the identified one or more content objects; and
   sending, to the client system, instructions for displaying a search-results interface comprising one or more search results corresponding to one or more of the identified one or more content objects, respectively, wherein the search results are displayed in ranked order based on the rankings of the corresponding one or more content objects,
   wherein each of the one or more extrema time windows corresponds to a time window of a respective time-based distribution of the time based distributions having a count of actions that is a respective local or global extremum of the plurality of time windows for the respective time-based distribution.

2. The method of claim 1, wherein modifying the search query based at least in part on the determined one or more extrema time windows comprises:
   if one or more of the determined one or more extrema time windows is the respective global or local maximum and not older than a threshold age, then generating instructions to search a core index associated with the communication network, wherein the core index indexes content objects having an upload age to the communication network within a threshold number of days;
   else, generating instructions to search a full index associated with the communication network, wherein the full index indexes all content objects that have been uploaded to the communication network.

3. The method of claim 1, wherein modifying the search query based at least in part on the determined one or more extrema time windows comprises modifying the search query to include instructions to identify a specified portion of content objects having an upload age within one or more of the one or more determined extrema time windows.

4. The method of claim 1, wherein ranking the identified one or more content objects comprises ranking objects based on an upload age of the respective content object, wherein content objects having an upload age within one or more of the determined one or more extrema time windows are upranked.

5. The method of claim 1, wherein, for each identified n-gram, the actions associated with the n-gram comprise a count of queries using the n-gram.

6. The method of claim 1, wherein, for each identified n-gram, the actions associated with the n-gram comprise a count of posts of content objects containing the n-gram.

7. The method of claim 1, wherein, for each identified n-gram, the actions associated with the n-gram comprise a count of impressions of content objects containing the n-gram.

8. The method of claim 1, wherein, for each identified n-gram, the actions associated with the n-gram comprise a count of click-throughs on content objects containing the n-gram.

9. The method of claim 1, wherein, for each identified n-gram, the time-based distribution is generated responsive to receiving the search query.

10. The method of claim 1, wherein, for each identified n-gram, the time-based distribution is pre-generated by the one or more computing devices.

11. The method of claim 1, wherein, for each identified n-gram, each time window of the plurality of time windows covers an equal period of time.

12. The method of claim 1, wherein, for each identified n-gram, the time-based distribution is generated at least in part based on a plurality of time-window counters associated with a plurality of search queries, respectively, wherein the time-window counter outputs a plurality of parameters, the parameters comprising one or more of: <n-gram>, <queryTime>, <postTime>, , <click ID>, or <click ID age>, wherein for each search query:
<n-gram> is an n-gram from the search query;
<queryTime> is the date and time that the communication network received the search query;
<postTime> is the date and time that a content object clicked on responsive to the search query was posted to the communication network;
 are the identification strings of the identified objects matching the search query, where i is the number of identified objects;
<click ID> is the identification string of a content object clicked on responsive to the search query; and
<click ID age> is the age of the content object that was selected by the user, wherein <click ID age>=<postTime>−<queryTime>.

13. The method of claim 1, wherein at least one of the accessed time-based distributions is a time-based distribution for an identified n-gram comprising two or more terms, wherein the time-based distribution comprises a count of actions associated with the two or more terms.

14. The method of claim 1, wherein determining the one or more extrema time windows of the plurality of time windows based on the time-based distributions of the n-grams comprises determining one or more time windows common to two or more of the time-based distributions that have a respective global or local extremum.

15. One or more computer-readable non-transitory storage media embodying software that is operable when executed to:
receive, from a client system associated with a first user of a communication network, a search query comprising a character string;
parse the search query to identify n-grams;
access, for each identified n-gram, a time-based distribution comprising a count of actions associated with the n-gram, wherein the actions occurred within a plurality of time windows, and wherein the time-based distribution counts the actions within each time window of the plurality of time windows;
determine one or more extrema time windows of the plurality of time windows based on the time-based distributions for the n-grams;
modify the search query based at least in part on the determined one or more extrema time windows;
execute the modified search query to identify one or more content objects that match the modified search query;
rank the one or more identified content objects; and
send, to the client system, instructions for displaying a search-results interface comprising one or more search results corresponding to one or more of the identified content objects, respectively, wherein the search results are displayed in ranked order based on the rankings of the corresponding one or more content objects,
wherein each of the one or more extrema time windows corresponds to a time window of a respective time-based distribution of the time-based distributions having a count of actions that is a respective local or global extremum of the plurality of time windows for the respective time-based distribution.

16. A system comprising:
one or more processors; and
a non-transitory memory coupled to the processors comprising instructions executable by the processors, the processors operable when executing the instructions to:
receive, from a client system associated with a first user of a communication network, a search query comprising a character string;
parse the search query to identify n-grams;
access, for each identified n-gram, a time-based distribution comprising a count of actions associated with the n-gram, wherein the actions occurred within a plurality of time windows, and wherein the time-based distribution counts the actions within each time window of the plurality of time windows;
determine one or more extrema time windows of the plurality of time windows based on the time-based distributions for the n-grams;
modify the search query based at least in part on the determined one or more extrema time windows;
execute the modified search query to identify one or more content objects that match the modified search query;
rank the identified one or more content objects; and
send, to the client system, instructions for displaying a search-results interface comprising one or more search results corresponding to one or more of the identified one or more content objects, respectively, wherein the search results are displayed in ranked order based on the rankings of the corresponding one or more content objects,
wherein each of the one or more extrema time windows corresponds to a time window of a respective time-based distribution of the time based distributions having a count of actions that is a respective local or global extremum of the plurality of time windows for the respective time-based distribution.

* * * * *